United States Patent
Bryant (10) Patent No.: US 10,351,261 B1
(45) Date of Patent: Jul. 16, 2019

(54) AUTONOMOUS DRONE BASED PACKAGE RECEPTION AND SURVEILLANCE SYSTEM

(71) Applicant: Carolyn Bryant, Pasadena, CA (US)

(72) Inventor: Carolyn Bryant, Pasadena, CA (US)

( * ) Notice: Subject to any disclaimer, the term of this patent is extended or adjusted under 35 U.S.C. 154(b) by 0 days.

(21) Appl. No.: 16/105,936

(22) Filed: Aug. 20, 2018

Related U.S. Application Data (63) Continuation-in-part of application No. 15/957,756, filed on Apr. 19, 2018, which is a continuation-in-part of application No. 15/912,316, filed on Mar. 5, 2018.

(51) Int. Cl.
| | |
|---|---|
| *B64F 1/32* | (2006.01) |
| *G06Q 50/28* | (2012.01) |
| *B64F 1/00* | (2006.01) |
| *B64F 1/36* | (2017.01) |
| *B64C 39/02* | (2006.01) |

(52) U.S. Cl.
CPC ............ *B64F 1/32* (2013.01); *B64C 39/024* (2013.01); *B64F 1/007* (2013.01); *B64F 1/362* (2013.01); *G06Q 50/28* (2013.01); *B64C 2201/027* (2013.01); *B64C 2201/128* (2013.01); *B64C 2201/141* (2013.01); *B64C 2201/20* (2013.01)

(58) Field of Classification Search
CPC ............ B64C 39/024; B64C 2201/027; B64C 2201/128; B64C 2021/141; B64C 2201/20; B64F 1/32; B64F 1/362; B64F 1/10; G06Q 50/28; G08G 5/0069; G08D 1/00
See application file for complete search history.

(56) References Cited

U.S. PATENT DOCUMENTS

| | | | | |
|---|---|---|---|---|
| 8,511,606 | B1* | 8/2013 | Lutke | B64C 39/028 |
| | | | | 244/100 R |
| 9,056,676 | B1* | 6/2015 | Wang | B64F 1/00 |
| 9,139,310 | B1* | 9/2015 | Wang | B64F 1/36 |
| 9,211,025 | B1* | 12/2015 | Elhawwashy | A47G 29/14 |
| 9,221,537 | B2* | 12/2015 | Wang | B64C 39/024 |
| 9,244,147 | B1* | 1/2016 | Soundararajan | G01S 1/44 |
| 9,284,062 | B2* | 3/2016 | Wang | B60L 11/1809 |

(Continued)

*Primary Examiner* — Medhat Badawi
(74) *Attorney, Agent, or Firm* — William J. Benman; Benman, Brown & Williams (57) ABSTRACT

A system and method for autonomous drone-based package reception and surveillance of the present invention. In accordance with the inventive method, an at least partially enclosed chute is provided with dimensions sufficient to receive packages. A platform is mounted within the chute to receiving the packages. A mechanism is provided to move the platform from a first position within the chute to receive the packages to a second position within the chute to deliver the packages. In the best mode, the platform is a second drone. Multiple drones, equipped with wireless transceivers, cameras, lasers, lights, detectors and even weapons are networked to provide perimeter security. The chute includes a door secured with a wireless latch activated by a system controller. One or more identification symbols, such as QR codes, bar codes, symbols etc. are provided on the door to be read by the airborne delivery vehicle. Nodes are included for charging the airborne delivery vehicle and the site-based drones as well. The deployment of the nodes within the chute is controlled by the site-based drones. An optional scale is provided in the platform for weighing package upon delivery. The system is adapted for operation via a smartphone.

22 Claims, 5 Drawing Sheets

(56) References Cited

U.S. PATENT DOCUMENTS

| | | | |
|---|---|---|---|
| 9,290,277 B2* | 3/2016 | You | B64F 1/18 |
| 9,387,928 B1* | 7/2016 | Gentry | B64C 39/024 |
| 9,457,899 B2* | 10/2016 | Duffy | B64C 37/02 |
| 9,513,371 B2* | 12/2016 | Zhang | B64C 39/024 |
| 9,545,852 B2* | 1/2017 | Streett | B64C 39/024 |
| 9,764,836 B1* | 9/2017 | Elzinga | B64C 39/024 |
| 9,777,502 B2* | 10/2017 | Curlander | E04H 14/00 |
| 9,845,165 B2* | 12/2017 | Michalski | B64F 1/36 |
| 9,950,791 B2* | 4/2018 | Blomberg | B64F 1/368 |
| 9,957,045 B1* | 5/2018 | Daly | B64C 37/02 |
| 9,975,442 B2* | 5/2018 | Lee | B64D 45/08 |
| 9,975,651 B1* | 5/2018 | Eck | B64F 1/32 |
| 9,977,435 B2* | 5/2018 | Fisher | G06Q 10/08 |
| 9,997,079 B2* | 6/2018 | Paczan | G08G 5/045 |
| 10,013,886 B2* | 7/2018 | Blomberg | G08G 5/0013 |
| 10,028,606 B1* | 7/2018 | Ritchie | A47G 29/12 |
| 10,062,048 B2* | 8/2018 | High | G06Q 10/0832 |
| 10,062,292 B2* | 8/2018 | Blomberg | G08G 5/0039 |
| 10,078,330 B2* | 9/2018 | Bhageria | G05D 1/0027 |
| 10,102,757 B2* | 10/2018 | Manley | G08G 5/0069 |
| 10,109,209 B1* | 10/2018 | Buchmueller | G08G 5/0008 |
| 2005/0281075 A1* | 12/2005 | Chen | B82Y 10/00 365/151 |
| 2007/0200032 A1* | 8/2007 | Eadie | B64D 1/22 244/137.4 |
| 2010/0192764 A1* | 8/2010 | Ries | F01B 7/18 91/535 |
| 2013/0233964 A1* | 9/2013 | Woodworth | B64C 37/02 244/2 |
| 2014/0254896 A1* | 9/2014 | Zhou | B25J 9/0006 382/124 |
| 2014/0303814 A1* | 10/2014 | Burema | A01B 79/005 701/3 |
| 2015/0006005 A1* | 1/2015 | Yu | G06Q 10/08 701/22 |
| 2015/0120094 A1* | 4/2015 | Kimchi | B64C 39/024 701/3 |
| 2015/0158599 A1* | 6/2015 | Sisko | B64F 1/32 244/114 R |
| 2015/0175276 A1* | 6/2015 | Koster | B64F 1/32 244/114 R |
| 2015/0183528 A1* | 7/2015 | Walsh | B64F 1/32 701/3 |
| 2015/0332206 A1* | 11/2015 | Trew | G06Q 10/0836 705/330 |
| 2015/0353206 A1* | 12/2015 | Wang | B64F 1/00 244/114 R |
| 2016/0023762 A1* | 1/2016 | Wang | B64F 1/00 701/3 |
| 2016/0028230 A1* | 1/2016 | Elfman | H02J 1/00 318/504 |
| 2016/0123182 A1* | 5/2016 | Samaritano | B64C 27/08 416/1 |
| 2016/0159496 A1* | 6/2016 | O'Toole | B64F 1/32 244/110 E |
| 2016/0196756 A1* | 7/2016 | Prakash | B64C 39/024 701/3 |
| 2016/0207627 A1* | 7/2016 | Hoareau | B64D 1/02 |
| 2016/0209839 A1* | 7/2016 | Hoareau | G05D 1/0027 |
| 2016/0257423 A1* | 9/2016 | Martin | B64F 1/00 |
| 2016/0311526 A1* | 10/2016 | Geise | B64C 27/08 |
| 2016/0332748 A1* | 11/2016 | Wang | B64F 1/00 |
| 2016/0340021 A1* | 11/2016 | Zhang | B64C 27/08 |
| 2016/0368596 A1* | 12/2016 | Zhang | B64C 27/08 |
| 2016/0378108 A1* | 12/2016 | Paczan | B64C 37/02 705/330 |
| 2017/0091710 A1* | 3/2017 | Van Dyke | G06Q 10/0835 |
| 2017/0175413 A1* | 6/2017 | Curlander | E04H 14/00 |
| 2017/0305575 A1* | 10/2017 | Bash | B64F 1/32 |
| 2017/0320572 A1* | 11/2017 | High | B64C 39/024 |
| 2017/0328391 A1* | 11/2017 | Matsuda | B64C 29/02 |
| 2017/0349283 A1* | 12/2017 | Paunicka | B64D 5/00 |
| 2017/0355460 A1* | 12/2017 | Shannon | B64C 39/024 |
| 2018/0251234 A1* | 9/2018 | Wang | B64F 1/00 |
| 2018/0253979 A1* | 9/2018 | Rey | G08G 5/0013 |
| 2018/0255465 A1* | 9/2018 | Priest | H04W 16/18 |
| 2018/0260800 A1* | 9/2018 | Caution | G06Q 20/208 |
| 2018/0329431 A1* | 11/2018 | Cheng | G05D 1/101 |

* cited by examiner

AUTONOMOUS DRONE BASED PACKAGE RECEPTION AND SURVEILLANCE SYSTEM

BACKGROUND OF THE INVENTION

Field of the Invention

The present invention relates to electrical and mechanical systems. More specifically, the present invention relates to drones.

Description of the Related Art

Vending machines are well-known in the art. As noted by Wikipedia: "A vending machine is an automated machine that provides items such as snacks, beverages, alcohol, cigarettes and lottery tickets to consumers after money or a credit card is inserted into the machine. The first modern vending machines were developed in England in the early 1880s that dispensed postcards. Vending machines exist in many countries, and in more recent times, specialized vending machines that provide less common products compared to traditional vending machine items have been created and provided to consumers." https://en.wikipedia.org/wiki/Vending_machine.

Accordingly, conventional vending machines require the user to be physically present at the machine to select, pay for and receive product. For some users, this requirement imposes a significant restraint or inconvenience on the user.

Hence, for such users, there was a need in the art for an intelligent vending machine that does not require the user to be physically present to select, pay for or receive products purchased from the machine.

The need in the art is addressed by co-pending patent application filed Mar. 5, 2018 by C. Bryant entitled Networked Vending Machine With Drone Based Delivery and Augmented Reality Viewing Systems, Ser. No. 15/912,316 the teachings of which are hereby incorporated herein by reference. This application discloses and claims many novel features including drone-based delivery.

A need remains in the art for a drone-based delivery system capable of operating with the system disclosed and claimed in Bryant's system. That is, a need remains in the art for a technology for autonomous drone-based pickup and delivery from vending machines, kiosks, retail establishments, warehouses and residences and delivery to such diverse locations.

SUMMARY OF THE INVENTION

The need in the art is addressed by the autonomous drone-based package reception and surveillance system of the present invention. In accordance with the inventive method, an at least partially enclosed chute is provided with dimensions sufficient to receive packages from an airborne delivery vehicle such as a drone. A platform is mounted within the chute to receiving the packages. A mechanism is provided to move the platform from a first position within the chute to receive the packages to a second position within the chute to deliver the packages to a consumer.

In the best mode, the platform is a second drone. Multiple drones, equipped with wireless transceivers, cameras, lasers, lights, detectors and even weapons are networked to provide perimeter security.

In a specific embodiment, the chute includes a door secured with a wireless latch activated by a system controller. One or more identification symbols, such as QR codes, bar codes, symbols etc. are provided on the door to be read by the airborne delivery vehicle. In the best mode, the system includes nodes for charging the airborne delivery vehicle (drone) and the site-based drones as well. The deployment of the nodes within the chute is controlled by the site-based drones. An optional scale is provided in the platform for weighing package upon delivery. In addition, the system is adapted for operation via a smartphone and allows user control via voice recognition.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A system and method are taught below for autonomously receiving packages via an airborne delivery vehicle such as a drone implemented, by way of example with minor modifications in accordance with the present teachings as described more fully below, in accordance the teachings of U.S. Patent Application Publication number US 2017/0313421 A1, filed Apr. 28, 2017 by J. Gil entitled UNMANNED AERIAL VEHICLE INCLUDING A REMOVABLE PARCEL CARRIER, the teachings of which are hereby incorporated herein by reference.

Figure 1:
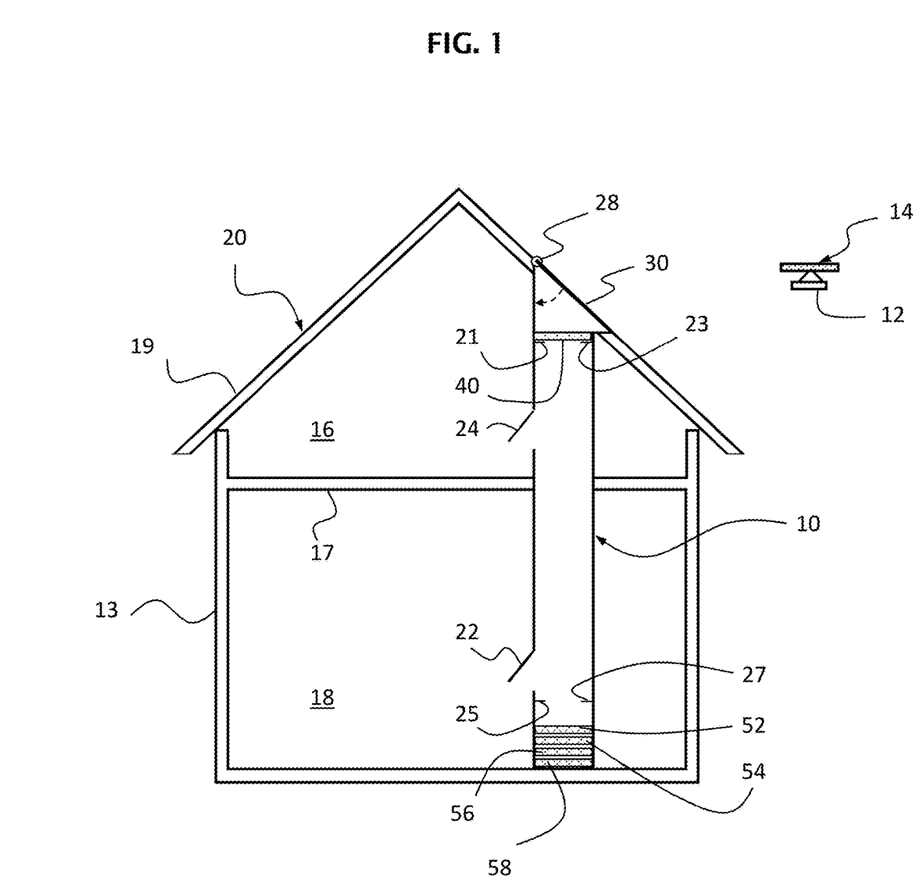
FIG. 1 is a sectional side view of an illustrative embodiment of the autonomous drone-based package reception and surveillance system of the present invention mounted within a house.

FIG. 1 is a sectional side view of an illustrative embodiment of the Bryant autonomous drone-based package reception and surveillance system of the present invention mounted within a house.

Figure 2:
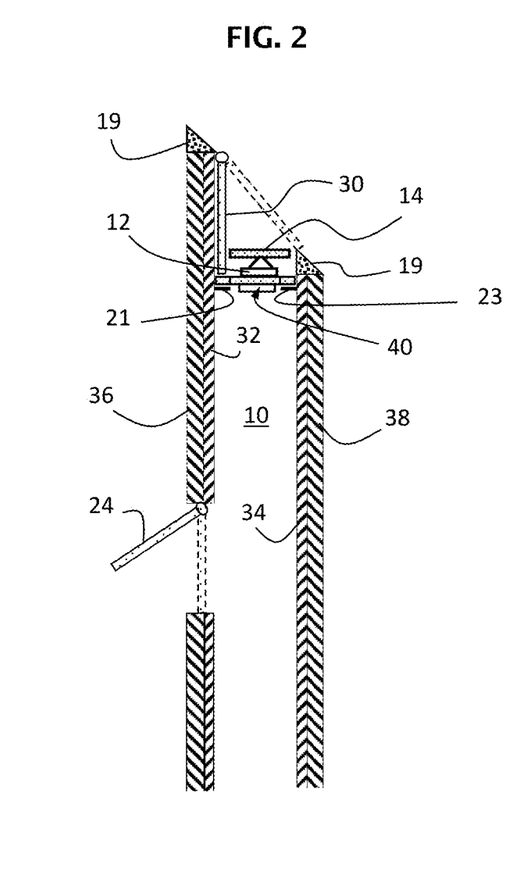
FIG. 2 is a fragmented magnified sectional side view of the illustrative embodiment of the upper section of the autonomous drone-based package reception and surveillance system depicted in FIG. 1.

FIG. 2 is a fragmented magnified sectional side view of the illustrative embodiment of the upper section of the autonomous drone-based package reception and surveillance system depicted in FIG. 1.

Figure 3:
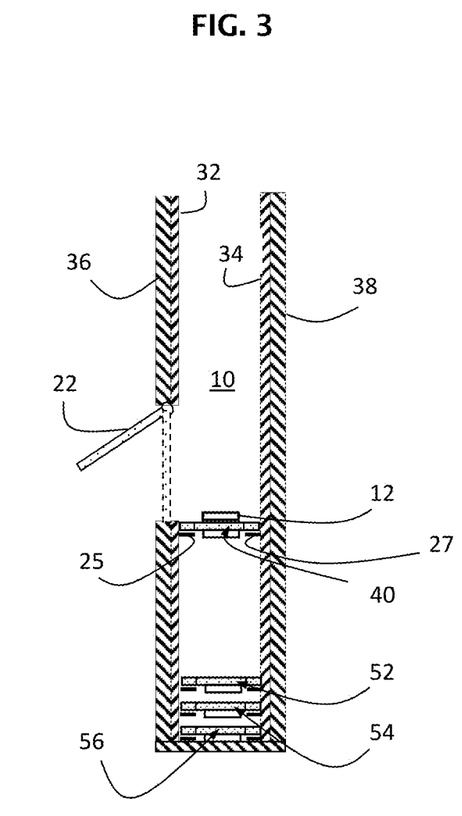
FIG. 3 is a fragmented magnified sectional side view of the illustrative embodiment of the lower section of the autonomous drone-based package reception and surveillance system depicted in FIG. 1.

FIG. 3 is a fragmented magnified sectional side view of the illustrative embodiment of the lower section of the autonomous drone-based package reception and surveillance system depicted in FIG. 1 showing a Bryant drone stack implemented in accordance with the present teachings.

As shown in FIGS. 1-3, an at least partially enclosed elongate rectangular cylindrical chute 10 is provided with dimensions sufficient to receive packages 12 anticipated as being delivered by a Bryant airborne delivery vehicle (drone) 14. The package could be sealed in a secure container that can only be opened by the confirmation number given to the customer at the time of placing the order. The drone then securely locks the order in place preparing for delivery.

The chute 10 may be constructed of any sufficiently sturdy material such as aluminum, steel, plastic, wood, etc. The chute 10 has multiple remotely actuated, retractable charging nodes 21, 23, 25 and 27 and hinged access doors 22 and 24 for removing packages. One or more of the doors could be made of transparent material such as plastic.

As shown in the magnified views of FIGS. 2 and 3, the chute has inner walls 32 and 34 and outer walls 36 and 38. The outer walls 36 and 38 may be provided by the structure 20 within which the chute 10 is mounted or eliminated altogether without departing from the scope of the present teachings.

The top of the chute 10 is secured with an electronically secured, motorized, retractable door 30 at the roof 19 of a structure such as a house 20. However, it should be noted that the present invention is not limited to a mounting of the chute 10 inside a structure. The chute may be located outside a structure without departing from the scope of the present teachings.

Figure 4:
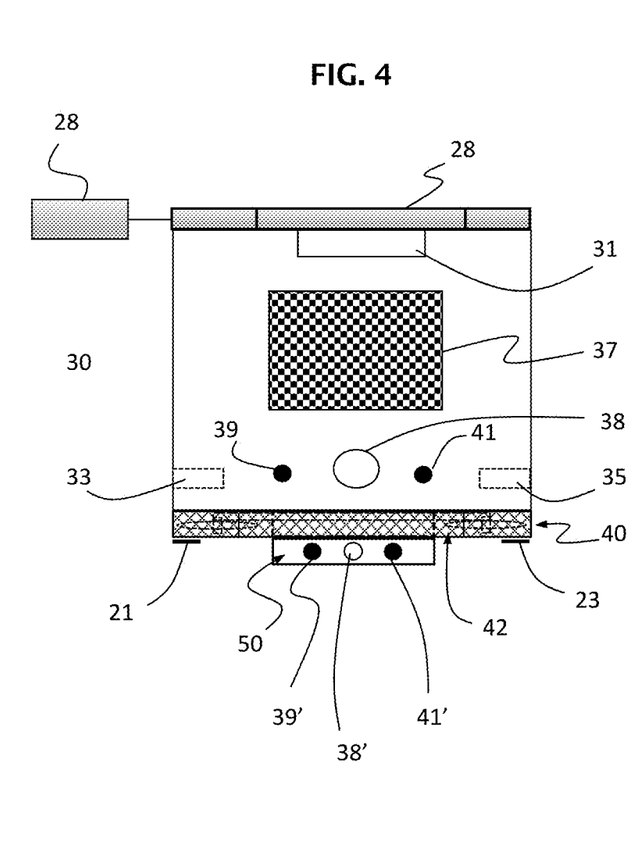
FIG. 4 is a top view of the autonomous drone-based package reception and surveillance system of the present invention depicted in FIG. 1 with the chute and house removed for clarity.

The door 30 is shown more clearly in the front view of FIG. 4.

FIG. 4 is a top view of the autonomous drone-based package reception and surveillance system of the present invention depicted in FIG. 1 with the chute and house removed for clarity.

Figure 5:
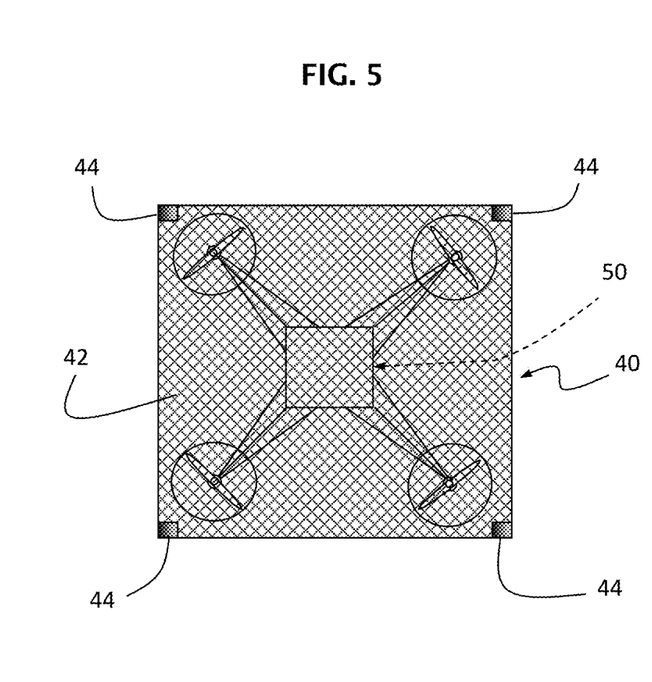
FIG. 5 is a bottom view of the site based receiving drone of the present invention.

FIG. 5 is a bottom view of the site based receiving drone of the present invention.

As illustrated in FIGS. 4 and 5, the chute 10 includes a door secured, when in the fully closed position, by a wireless latch 33, 35 activated by a system controller discussed below. In the illustrative embodiment, the door 30 is constructed of a durable, optionally transparent, plastic material and has a rubber seal around the periphery to prevent leakage from rain or snow. However, those of ordinary skill in the art will appreciate that other materials may be used for the door without departing from the scope of the present teachings.

Those of ordinary skill in the art will appreciate that on a flat roof, the door could be mounted in a substantially horizontal orientation, though not necessarily.

The door 30 is supported by a motor 29 via a bracket 31. In the best mode, the motor 29 is a simple inductive motor with a rotor and a stator, with the rotor coupled to the bracket 31. An actuator 28 controls the motor 29 on receipt of a signal from a controller or drone as discussed more fully below. The actuator 29 may be wireless or wired. If wireless, the actuator 29 includes a transceiver, processor and memory operably connected to provide open and close signals on command.

The door 30 can be equipped with a processor (not shown), lights (not shown), a camera 38, laser 39 and laser range finder detector 41 to autonomously assist in terminal homing by the incoming drone 14. In this case, the camera and/or laser range finder would signal the lights to change frequency, color or pulse rate to guide the drone 14 in low light conditions.

One or more identification symbols 37, such as QR codes (represented as a simple checkered pattern 37 in FIG. 4), bar codes, symbols, and/or etc. are provided on the door 30 to be read by the airborne delivery vehicle 14 on final approach. The same code may be provided on the platform 40. The code may be displayed via print or etched media or via an electronic display.

As shown in FIG. 1, a platform 40 is mounted within the chute 10 to receive the packages. A mechanism is provided to move the platform from a first position within the chute to receive the packages to a second position within the chute 10 to deliver the packages. While conventional elevator type mechanisms may be used, in the best mode, the mechanism is a drone 40.

As shown in FIG. 4, in the best mode, the drone 40 is substantially planar in design and constructed with plastic mesh housing 42. The mesh housing 42 provides a sturdy, light weight, aerodynamic platform for packages. While a metallic mesh can be used, plastic is preferred to avoid interference with radio signal transmission and reception. An electromagnetic pad on the mesh may be used to secure the package against slippage during transport via the use of a plate on (or metallic) package transport container 12.

In accordance with the present teachings, the drone 40 is structured and powered to support packages of weight and size anticipated for delivery. The drone 40 is equipped with fully integrated and interoperable processors, memory, propellers, propeller drivers, battery, wireless transceivers (Bluetooth and WiFi), cameras 38', spotlight, siren, a scale, laser 39', motion detector 41', microphone and speaker and/or laser range finder of which all except the propellers and propeller motors (not shown) should be provided within a housing 50.

Contacts 44 are provided on the mesh cage to engage retractable charging nodes of which only 21, 23, 25 and 27 are shown in FIGS. 1 and 4. The charging nodes are powered by a wirelessly actuated node controller (not shown) and thereby deployed by the drone(s) described herein when a low battery condition is detected.

Each charging node could be implemented with a simple inductive motor designed to rotate in either direction on receipt of a positive or negative current. A physical stop should be provided to enable a drone to rest on a set of four nodes for a period of time without drawing current. Each node should have an exposed conductive surface to electrically connect with contacts 44 on each drone. The exposed conductive surface is separately powered by a charging circuit with a subset of two (2) nodes of any set having a first (e.g. positive) charge and another subset of two (2) nodes having an opposite or ground charge.

With the exception of the set of charging nodes (not shown) at the very bottom floor of the chute 10, each set of nodes is spring loaded and biased in the closed (up) position to ensure fast operation and to remain out of the way of the drones if and when an actuator motor fails. Those of ordinary skill in the art will understand that other mechanisms (such as linear solenoid type schemes) may be employed without departing from the scope of the present teachings.

In the best mode, a single transceiver and processor are operationally coupled to the chute 10 to control the latches, nodes and other electronic components mounted thereof as discussed herein.

The use of a drone as an elevator platform enables the chute 10 to be 'virtual' in construction. That is, the chute need not be a single unitary elongate rectangular cylinder. On the contrary, by implementing the receiving platform with a drone, the walls of the chute 10, between upper and lower levels 16 and 18 respectively of a house 20 within which it is mounted, may be eliminated. All that is required, in this case, is an aperture through each floor 17. In the best mode, for safety reasons, each aperture for the virtual chute is covered with a door or gate (not shown) actuated (preferably wirelessly) by the system controller and/or the receiving platform drone as disclosed more fully below. The apertures through the floors should be in alignment but need not be as the drone should be able to navigate within the structure to the next portal or floor located door or gate.

An optional scale is provided in the platform for weighing package upon delivery.

Figure 6:
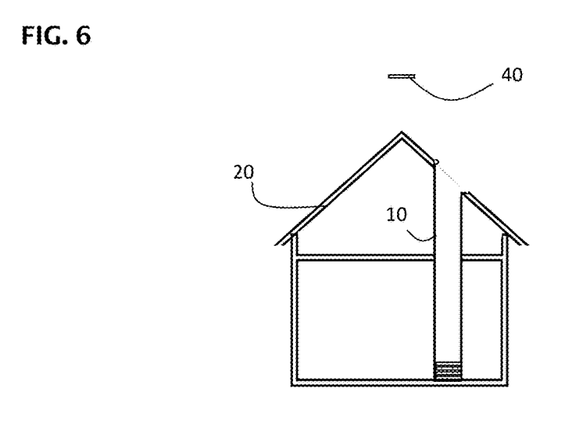
FIG. 6 is a side view of the autonomous drone-based package reception and surveillance system of the present invention depicted in FIG. 1 with the chute open and a first site-based drone deployed above the house in a control position.
Figure 7:
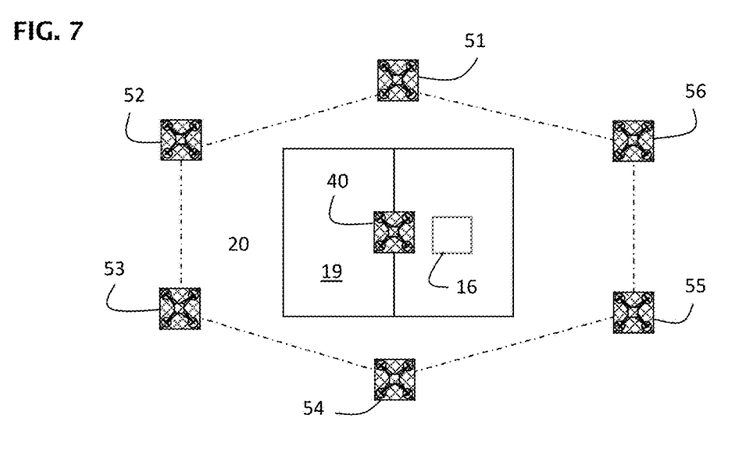
FIG. 7 is a top schematic view of the autonomous drone-based system of the present invention with drones deployed to provide a security perimeter.

As shown in FIGS. 6 and 7, multiple drones 51-56, equipped with wireless transceivers, cameras, lasers, lights, detectors and even weapons may be included and networked to provide ground-based perimeter detection and air space protection.

FIG. 6 is a side view of the autonomous drone-based package reception and surveillance system of the present invention depicted in FIG. 1 with the chute open and a first site-based drone 40 deployed above the house in a control position.

FIG. 7 is a top schematic view of the autonomous drone-based system of the present invention with drones 51-56 deployed to provide a security perimeter.

Figure 8:
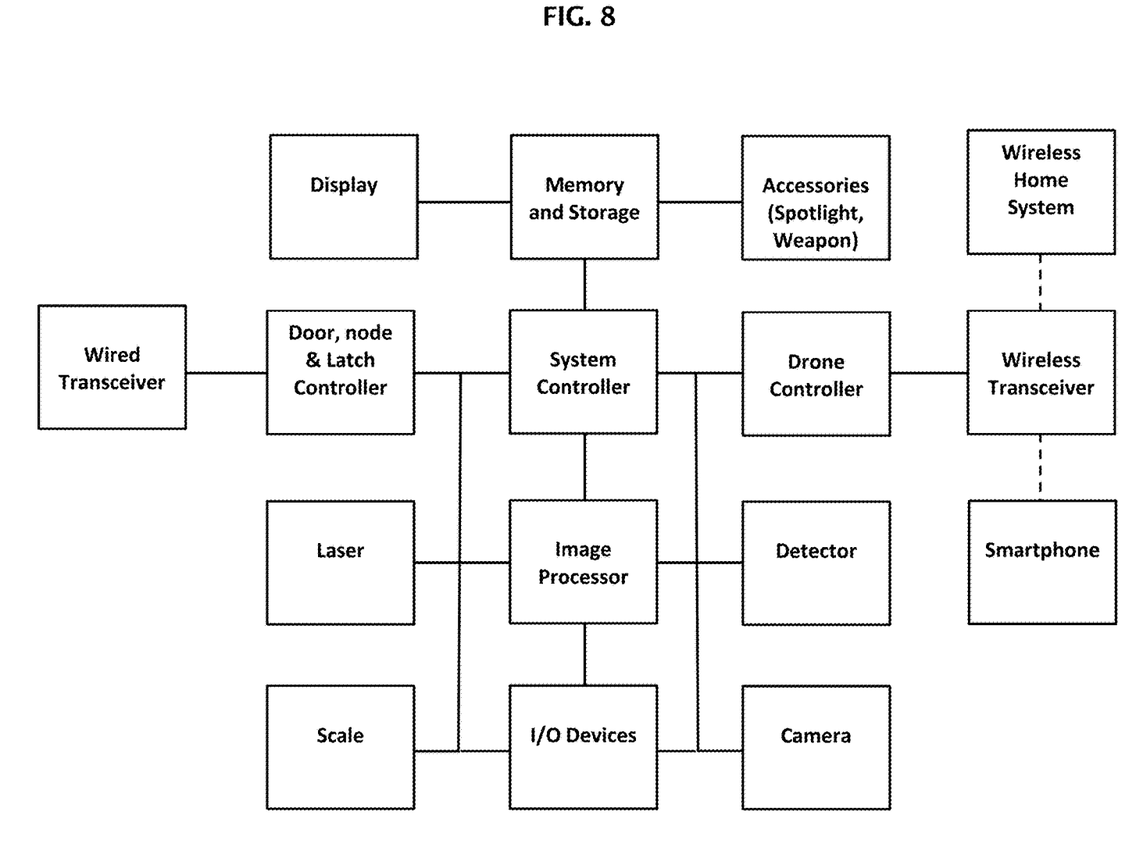
FIG. 8 is a block diagram of an illustrative embodiment of the autonomous drone-based system of the present invention.

As shown in FIG. 8, the system is adapted for operation via a microphone (voice activation), smartphone or other home based control system (aka 'virtual assistants') such as Alexa, Google Home, Siri, etc. The smartphone or smart home system (or personal computer) could provide ID security (biometric identification) to unlock secure doors 22 and 24, and other features such as notification of package status, package returns via home based drone 40 etc.

FIG. 8 is a block diagram of an illustrative embodiment of the autonomous drone-based system of the present invention. The system controller may be centralized in the house 20 or a single drone or distributed between the drones and any house bound processors. The system controller may be implemented with one or more microprocessors with associated electronic and other physical and electronic memory mediums as is common in the art. User controlled is effectuated via common I/O (input/output) devices such as keyboard, voice recognition, displays, microphones, speakers etc. Further, system I/O may be achieved via use of smartphones running a suitably programmed system control app.

Certain components of the system, such as the scale, laser, camera, laser range finder, motion detector and image processor may be implemented on one or more of the drones or integrated into the door or lid 30 or any other door 22, 24 of the chute 10.

The system controller commands the actuators for the doors, nodes and latches via an actuator controller with analog to digital converters as is common in the actuator field via wired and/or wireless transceivers. Wired commands may be facilitated via the conventional internal AC wiring system of the house 20.

Drone deployment and positioning is effectuated via a drone controller implemented with a processor programmed to execute an optimization algorithm based on the plural inputs received from internal and external sensors, conditions and user commands and preferences.

In any case, the present invention is not limited to the command system shown in FIG. 8. Other circuits and systems optimized for a particular application or feature may be used employed without departing from the scope of the present teachings.

Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. A system for autonomously receiving packages via a first drone, the system comprising:
   a chute mounted to receive packages directly from said first drone,
   a second drone mounted within the chute for receiving the packages from the first drone, and
   moving the packages from a first position to a second position within the chute, said second drone having a housing that provides a platform for receiving the packages on an upper surface of said receiving drone; and
   a mechanism for securing said package to said housing, said mechanism including an electromagnetic pad mounted on said upper surface of the housing to secure the packages against slippage during transport.

2. The system of claim 1 wherein the chute includes a door.

3. The system of claim 2 wherein the door is secured with a wireless latch.

4. The system of claim 3 wherein the system includes a controller operationally coupled to the latch.

5. The system of claim 2 wherein the system includes an arrangement for charging the airborne delivery vehicle.

6. The system of claim 2 wherein the system includes a scale for weighing a package delivered by the airborne delivery vehicle.

7. The system of claim 2 wherein the system has one or more identification symbols readable by the airborne delivery vehicle.

8. The system of claim 2 wherein the system is adapted to respond to a user via voice recognition.

9. The system of claim 1 wherein the chute includes nodes for charging a battery on said second drone.

10. The system of claim 1 wherein said second drone includes a wireless transceiver.

11. The system of claim 1 wherein said second drone includes a camera.

12. The system of claim 1 further including multiple drones adapted for housing within the chute.

13. The system of claim 12 wherein the drones are equipped with transceivers and processors for connecting the drones in a network.

14. The system of claim 13 wherein at least one of the drones includes a spotlight.

15. The system of claim 13 wherein a first of the drones includes a laser and a second of the drones includes a laser detector.

16. The system of claim 13 wherein at least one of the drones includes a microphone.

17. The system of claim 16 wherein at least one of the drones includes a speaker.

18. The system of claim 13 wherein the system includes networked wireless transceivers mounted on said drones whereby the drones communicate to provide a secure perimeter.

19. The system of claim 18 wherein the perimeter provides a secure dome of aerial drone coverage around the structure.

20. The system of claim 1 further including a laser range finder for providing terminal homing data to the first drone.

21. A system for autonomously receiving a package from a delivery drone, the system including:
   a simulated chute,
   a receiving drone serving as a platform, for receiving the package directly from the delivery drone and moving the received package within the simulated chute from a first position to a second position, the receiving drone including:
   a housing that provides the platform for receiving the packages on an upper surface of said receiving drone; and
   a mechanism for securing said package to said housing, said mechanism including an electromagnetic pad mounted on said upper surface of the housing to secure the packages against slippage during transport.

22. A method for autonomously receiving packages via an airborne delivery vehicle, the method including the steps of:
   providing an at least partially enclosed chute with dimensions sufficient to receive packages;
   providing a platform within the chute for receiving the packages; and
   using a mechanism to move the platform from a first position within the chute to receive packages to a second position within the chute to deliver the packages,
   wherein the airborne delivery vehicle includes a first drone and the mechanism to move the platform is a second drone having a housing that provides the platform for receiving the packages on an upper surface of said receiving drone; and
   a mechanism for securing said package to said housing, said mechanism including an electromagnetic pad mounted on said upper surface of the housing to secure the packages against slippage during transport.

\* \* \* \* \*